Figure 1:
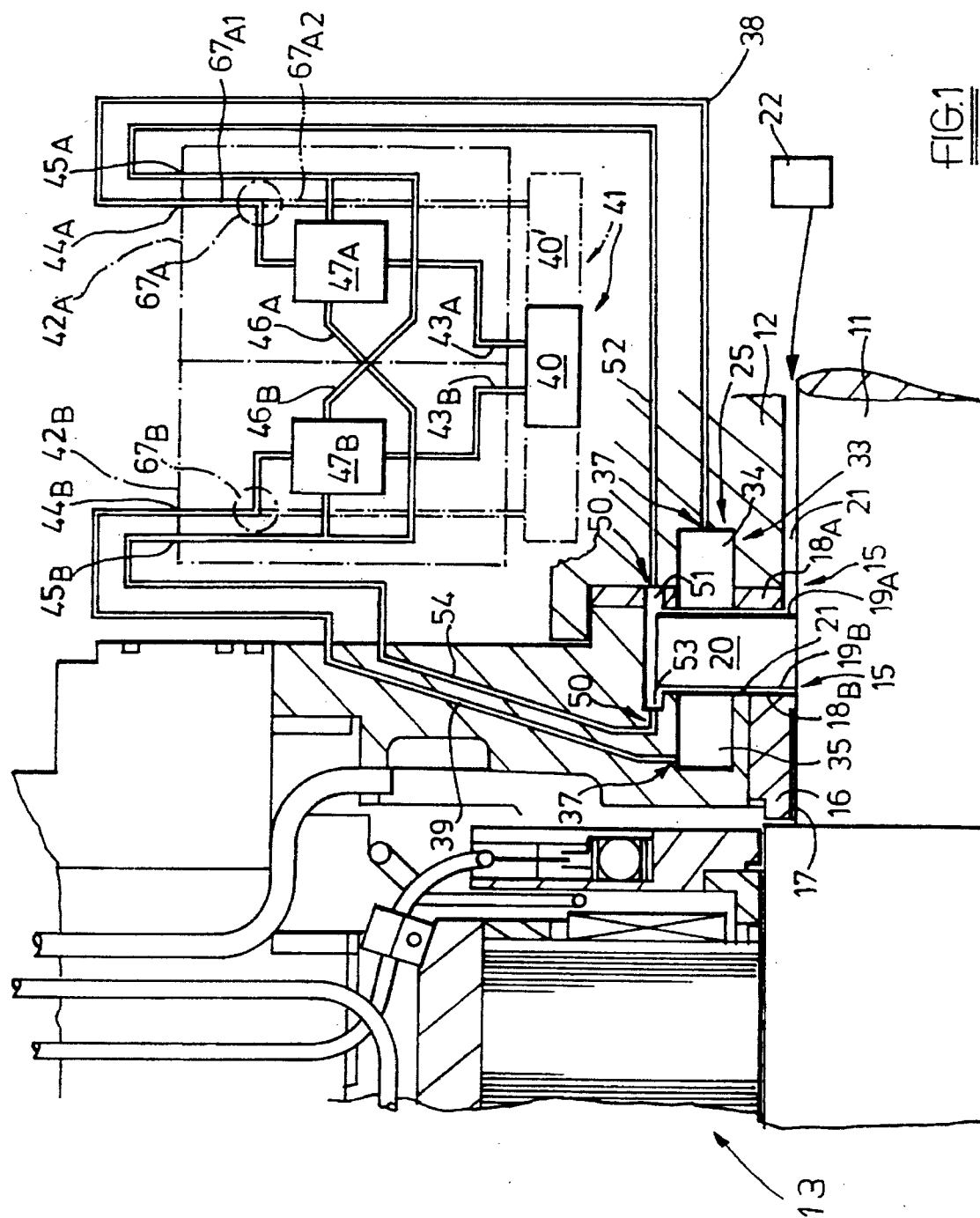

US005578881A

United States Patent [19]
Swann et al.

[11] Patent Number: 5,578,881
[45] Date of Patent: Nov. 26, 1996

[54] AXIAL VIBRATION DAMPING ARRANGEMENT

[75] Inventors: Michael K. Swann, Gales Ferry; Richard R. Shultz, Groton, both of Conn.

[73] Assignee: Glacier RPB Inc., Mystic, Conn.

[21] Appl. No.: 313,600

[22] Filed: Sep. 29, 1994

[51] Int. Cl.$^6$ .................. H02K 7/09; H02K 5/24
[52] U.S. Cl. ........................ 310/90.5; 310/51
[58] Field of Search ............ 310/51, 90.5; 384/100, 384/107, 121

[56] References Cited

U.S. PATENT DOCUMENTS

| | | | |
|---|---|---|---|
| 2,523,310 | 9/1950 | Kirkpatrick | 384/121 |
| 2,661,580 | 12/1953 | Crompton, Jr. | 451/156 |
| 3,146,037 | 8/1964 | Hooker | 384/121 |
| 3,895,689 | 7/1975 | Swearingen | 384/121 |
| 4,193,644 | 3/1980 | Mihashita et al. | 384/107 |
| 4,915,510 | 4/1990 | Arvidsson | 384/121 |
| 4,970,422 | 11/1990 | Lind | 310/51 |
| 5,042,616 | 8/1991 | McHugh | 384/121 |
| 5,104,284 | 4/1992 | Hustak, Jr. et al. | 310/90.5 |
| 5,342,825 | 8/1994 | Iannello et al. | 310/90.5 |
| 5,355,040 | 10/1994 | New | 310/90.5 |

FOREIGN PATENT DOCUMENTS

| | | | |
|---|---|---|---|
| 2814578 | 10/1978 | Germany . | |
| 60-109612 | 6/1985 | Japan . | |
| 2-190613 | 7/1990 | Japan | 384/121 |
| 769502 | 10/1980 | U.S.S.R. | 384/100 |
| WO92/05874 | 4/1992 | WIPO . | |

Primary Examiner—Clayton E. LaBalle
Attorney, Agent, or Firm—Nixon & Vanderhye P.C.

[57] ABSTRACT

A damping arrangement (FIG. 1) for axial vibrations in a turbomachine shaft 10 comprises at least one circumferentially extending annular damping chambers 34 and 35 open towards a shaft thrust face $19_A$ and $19_B$ of a radially extending collar 20 and to which gas is supplied alternately by gas flow controllers $42_A$ and $42_B$. Each controller contains fluidic devices switched by sensing pressures in radially displaced pressure sensing chambers 51, 53, or even the same chambers, as such pressure are modulated by the variations in shaft and collar position, to divert the gas from source 40. The diversion of gas flow is arranged to cause pressure fluctuations, which exert axial thrust on the thrust faces, advanced in phase to approach of the shaft so as to damp the vibration. The fluidic devices may be implemented by flow amplifiers $47_A$, $47_B$ or fluid logic flip flop 61 (FIG. 2) and may be multistage devices to increase gain, all of which may be formed without moving parts and embedded in the housing. Flow diversion may be effected by other forms of sensing, such as leakage from a nozzle facing the shaft. The arrangement may be combined with, or serve as, a gas seal or be part of a bearing arrangement.

24 Claims, 3 Drawing Sheets

AXIAL VIBRATION DAMPING ARRANGEMENT

This invention relates to an axial vibration damping arrangement for a rotor shaft rotatable within a housing and maintained in position axially by a control system responsive to externally induced disturbances of the said axial position to apply restoring forces. Such a shaft having axial position control is frequently, but not exclusively, found in magnetic bearing arrangement in which the rotor shaft is suspended both radially and axially within electro magnetic fields controlled by said control system as a function of displacement from a desired position.

It is characteristic of such magnetic bearings that a very small suspension gap separates the shaft and appendages, rotating a very high speed, from stationary parts. To accommodate failure of the electromagnets or control circuits or inability of the control circuits to restore position, back-up bearing arrangements are employed which permit purposely positioned shaft surfaces on collars or the like to run in contact with stationary bearing materials, both to protect the electromagnetic components and to provide a rotational energy dissipating, that is, braking function for the shaft. It is furthermore known to provide cooling gas caused to flow across the bearing surfaces for extracting heat therefrom, which gas may also perform a sealing function for process gases associated with the machine of which the shaft is part.

Whereas the electromagnetic bearings and their control arrangements may be dimensioned and powered to suspend the shaft against continuous forces of any practicable magnitudes, they are less able to deal with cyclical variations in forces acting on the shaft, that is, vibrational reciprocation of the shaft, because of limited bandwidths of the control arrangements.

It has been found in installations wherein the externally applied or internally generated forces cause reciprocation of shaft position, particularly in axial direction, that a magnetic axial bearing may be overwhelmed without there being a fault in the magnetic bearing per se and the back-up bearing arrangement caused to operate unnecessarily and to the detriment of its longevity and efficiency of the magnetic bearing as a whole.

The need to provide damping for axial reciprocation of a shaft (or equivalent rotating body which the term 'shaft' used hereinafter is intended to include) due to externally induced forces is not limited to shafts suspended in a controlled magnetic bearing, and thus preserving the generality of the foregoing, it is an object of this invention to provide an axial thrust damping arrangement, for such a shaft, of simple construction.

It is also an object of the invention to provide a thrust damping arrangement which utilises gas associated with a bearing arrangement of the shaft.

It is furthermore an object of the present invention to provide an axial damping arrangement which may be implemented with minimal modifications to structures existing for bearing functions and a minimum of additional components.

In accordance with this invention an axial vibration damping arrangement for a rotor shaft rotatable within a housing comprises at least one radially extending thrust face fixed with respect to the rotor shaft and facing along the axis of the shaft, damping chamber means defined in the housing comprising at least one damping chamber open towards the thrust face and extending at least part way about the shaft, at least one supply of gas at elevated pressure, gas duct means opening into each said chamber and gas flow control means operable to provide a positive pressure within the damping chamber means acting axially on the thrust face and comprising, for each damping chamber, a flow controller responsive to reciprocation of the thrust face to and from the housing to modulate the supply of gas to the damping chamber by way of the duct means, and thus the pressure therein, at the same frequency as the thrust face reciprocation and advanced in phase with respect to variations in thrust face position relative to the chamber within a predetermined frequency range to effect a corresponding variation in axial thrust on the thrust face and damping of said shaft axial reciprocation.

Figure 6:
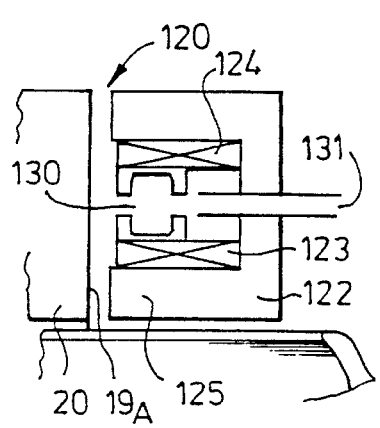
Figure 2:
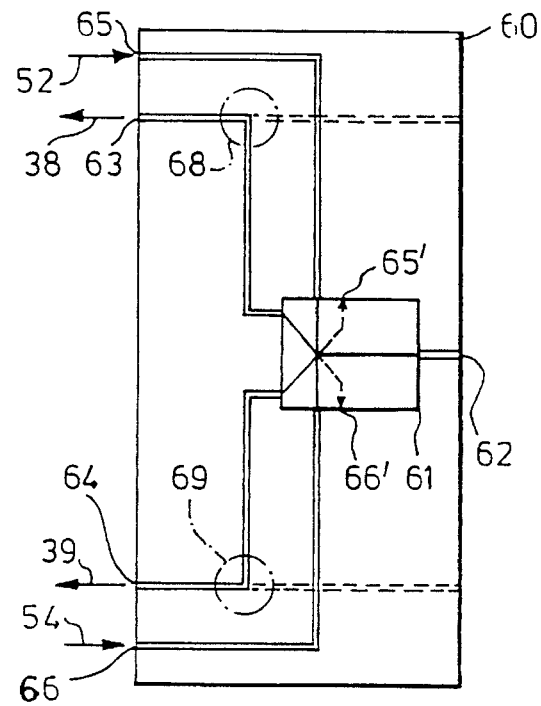
Figure 3A:
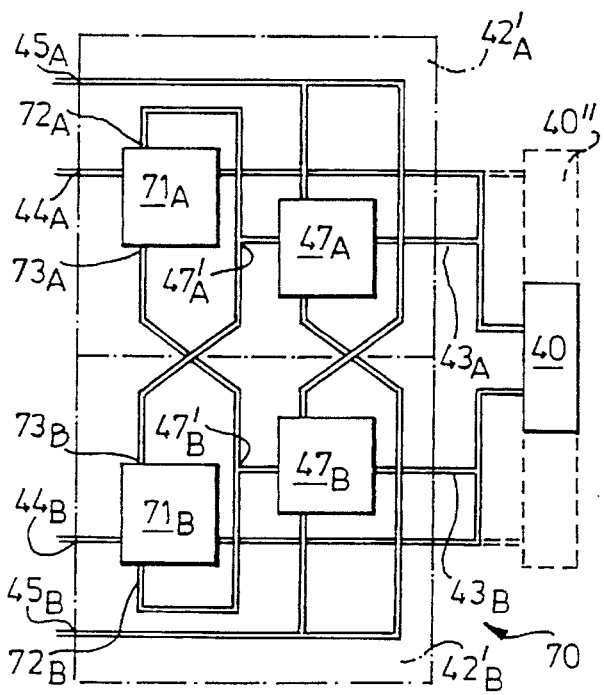
Figure 3B:
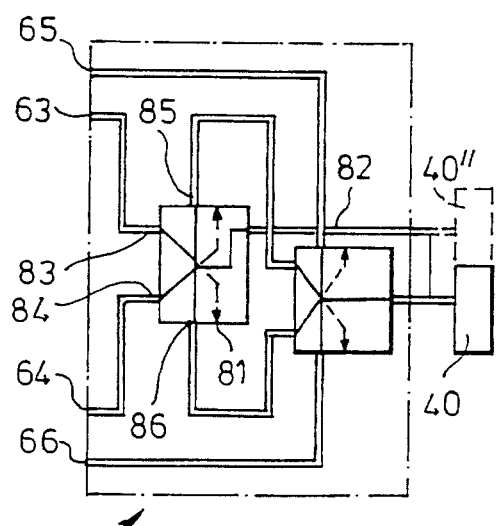
Figure 4:
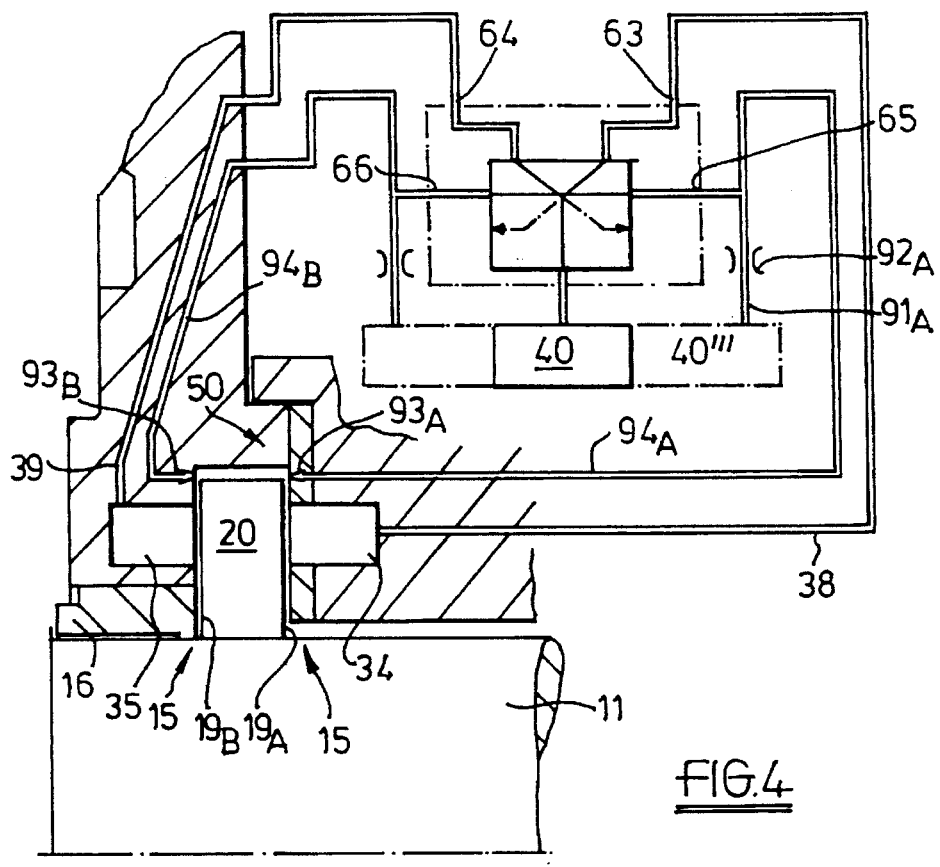
Figure 5:
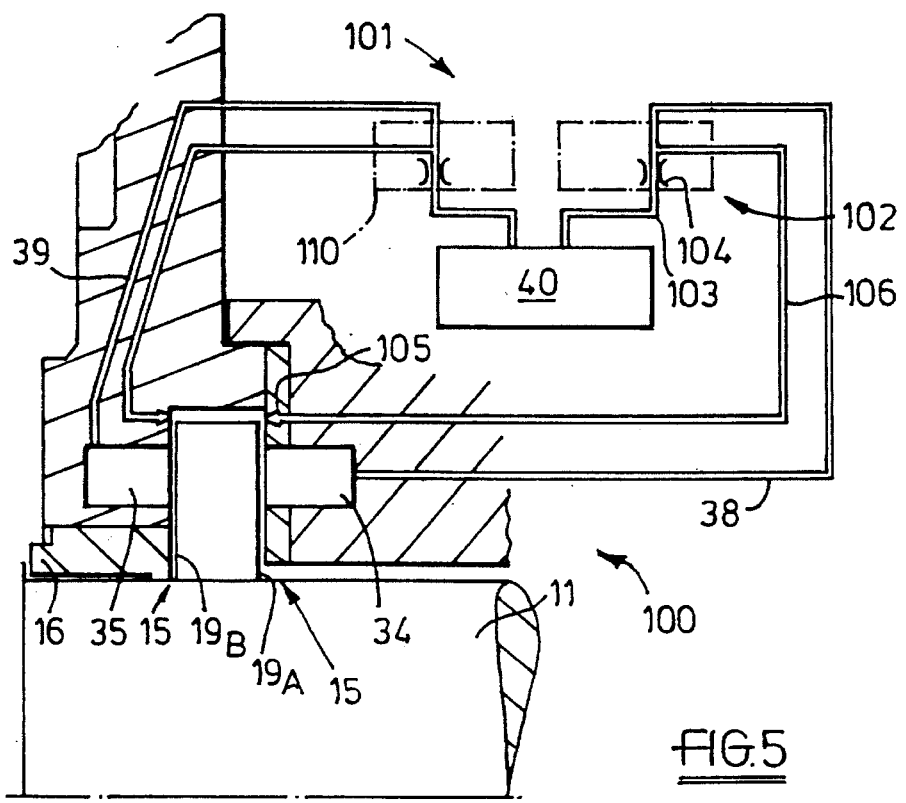

The invention will now be described with reference to the accompanying drawing, in which:

FIG. 1 is a sectional elevation through a portion of a housing and shaft contained therein supported axially by an electromagnetic thrust bearing and back-up bearing arrangement and including a first form of axial damping arrangement in accordance with the present invention, including gas flow control means comprising a first form of thrust face displacement feedback means a first form of gas flow controllers, FIG. 2 is a sectional elevation, similar to FIG. 1 but showing a second form of axial damping arrangement in accordance with the invention, employing a second form of gas flow controller, FIG. 3(a) is a schematic circuit diagram of a pair of gas controllers of a third form comprising a multi-stage arrangement of the devices of FIG. 1, FIG. 3(b) is a schematic circuit diagram of a pair of gas controllers of a fourth form comprising a multi-stage arrangement of the device of FIG. 2, FIG. 4 is a sectional elevation through part of the shaft and damping chamber arrangements of FIG. 1 illustrating a second form of thrust face displacement feedback means, and FIG. 5 is a sectional elevation through part of the shaft and damping chamber arrangement of FIG. 1 and schematic representation of an alternative form of gas control means incorporating, for each of a pair of oppositely disposed damping chambers, a directly acting gas controller, and FIG. 6 is a sectional elevation through a combined axial magnetic bearing and axial gas bearing including a damping chamber and duct means of a damping arrangement in accordance with the present invention.

Referring to FIG. 1 a rotor shaft 11 is suspended within a housing 12 by electromagnetic bearing means, part of which is shown at 13. To accommodate failure of the electromagnetic bearings to support the shaft a back-up bearing arrangement is provided shown generally at 15.

The back-up bearing arrangement includes a cylindrical block 16 of dry running bearing material extending about the shaft to provide radial back-up for a portion 17 of the shaft itself and flat annular blocks $18_A$ and $18_B$ of similar dry running bearing material to provide axial back-up for a faces $19_A$ and $19_B$ of a collar 20 secured to the shaft.

An annular clearance 21 exists between the shaft and housing and source 22 provides a supply of cooling gas by way of the clearance 21 to flow across the contact-making faces of the collar 20 and bearing materials $18_A$ and $18_B$ and between the shaft portion 17 and bearing material 16. In this construction the axial back-up bearing $18_A$, $19_A$ and $18_B$, $19_B$ provides support for the shaft against excessive displacement in both axial directions. The back-up bearing arrangements may be spaced axially along the shaft to provide the support for the shaft against excessive axial displacement in the opposite directions.

In accordance with the invention an axial thrust damping arrangement is provided as shown generally at 25. It comprises radially extending thrust faces provided by the faces $19_A$ and $19_B$ of collar 20 that are facing along the shaft and damping chamber means, indicated generally at 33 comprises damping chambers 34, 35 each in the form of an annular chamber which extends completely about the shaft. The damping chamber means, that is, each chamber thereof, opens towards a thrust face $19_A$ or $19_B$ of the collar 20.

The arrangement further comprises gas duct means 37 opening into each damping chamber, in the form of ducts 38 and 39, a gas supply 40 and gas flow control means indicated generally at 41.

The gas flow control means comprises gas flow controllers $42_A$ $42_B$ associated individually with the two damping chambers. For gas flow controller $42_A$, it has an input port $43_A$ connected to gas supply 40, an output port $44_A$ connected to the gas duct means 38 and a control input port $45_A$ and control input port $46_A$. The controller contains a self-powered fluidic device $47_A$ and the control inputs $45_A$ and $46_A$ are ports which respond to gas pressure to control the flow of gas between input and output ports $43_A$ and $44_A$ at a rate and pressure that represents a gain factor greater than one.

The controller $42_B$ is of corresponding form and parts corresponding to those of controller $42_A$ are indicated with a reference subscript 'B'.

The gas flow control means also comprises shaft displacement feedback means indicated generally at 50 and comprising, for each damping chamber 34 or 35, means to provide a feedback signal related to gas pressure in sensing chamber means, including at least one pressure sensing chamber radially displaced from the respective damping chamber. For damping chamber 34 and associated controller $42_A$ the feedback means comprises a pressure sensing chamber 51 and a feedback duct 52 extending between chamber 51 and the control input port $45_A$. In addition, the sensing chamber means comprises a further sensing chamber 53, which is disposed radially displaced from damping chamber 35, and a feedback duct 54 extending between the chamber 53 and the control input port $46_A$ of controller $47_A$.

In respect of controller $42_B$ the collar displacement means comprises the sensing chamber 53 and the feedback duct 54 extending between chamber 53 and control input $45_B$ and, in addition, the sensing chamber 51 and the feedback duct 52 extending between the sensing chamber 51 and the control input port $46_B$.

Considering operation of the damping arrangement as it involves the controller $42_A$, if the shaft 10 in rotating about axis 11 begins to vibrate along its shaft axis such that the collar 20 reciprocates to and from the clamping chambers, the pressure in the sensing chamber 51 is modulated by the distance between the shaft thrust face and the chamber and rises and falls by a limited amount in synchronism with the shaft vibration. The pressure variation in sensing chamber 51 is conveyed by feedback duct 52 to control input $45_A$. The further sensing chamber 53 likewise responds to reciprocation of the collar by exhibiting a pressure modulation 180 degrees out of phase with sensing chamber 51, conveyed by duct 54 to the controller $42_A$ at $46_A$.

Controller $42_A$ is switched as to its gas conduction by one or both of said pressures, indicative of a pressure rise in sensing chamber 51 and pressure fall in sensing chamber 53, to supply gas to damping chamber 34 through duct 38, the effect of which is to further increase the pressure and exert a radially directed force on the shaft which tends to drive it towards the damping chamber 35.

A short time later, as the shaft reciprocation tends to raise the pressure in sensing chamber 53 and reduce it in sensing chamber 51 shaft displacement feedback means returns a pressure rise to control input $46_A$ of the controller to inhibit the gas supply to damping chamber 51 and permit the pressure therein to fall by leakage.

It will be appreciated that once a vibrational shaft disturbance has begun which results in sensing chamber pressure variations at the vibration frequency and the controller $42_A$ being operated, the gas supply to the damping chamber 34 is switched on and off at the same frequency as the vibration to exert by way of the periodically increased pressure in damping chamber 34 an axially directed periodic thrust on the thrust face 19A of collar 20. Furthermore the periodic supply of gas at elevated pressure to the damping chamber can be at such a rate to ensure that the pressure therein remains elevated with respect to ambient pressure, notwithstanding leakage from the chamber.

In responding to detection of a pressure increase in sensing chamber 51 in advance of the shaft approaching damping chamber 34 associated with the controller $42_A$, the controller response, gas flow rate and supply pressure can be configured to provide the pressure increase in chamber 34 advanced in phase with respect to the shaft approach thereto by a predetermined amount and thus act to damp the vibration of the shaft.

It will be appreciated that the degree of damping is dependent not only upon the pressure of gas supplied but also upon the degree of phase advance. Depending upon the sensitivity of the control means and pressure sensing means and its response time a phase advance between 135 degrees and 0 degrees is achievable.

Preferably, to give damping at a particular vibration frequency whilst being effective at other frequencies, a phase advance of approximately 90 degrees with respect to collar position is defined by choice of any or all of the rate of gas supply, triggering threshold(s) of the gas flow control means and the pressure of source 40.

It will be seen that as such a vibration is opposed and damped by varying the supply of gas to chamber 34 by controller $42_A$, the gas flow controller $42_B$ is switched out of phase with controller $42_A$ by the same feedback signals oppositely supplied to its control inputs and delivers gas to chamber 35 also in advance of the shaft approach, thereby contributing equally or additionally to the vibration damping effect.

The active and self-powered gas flow controllers $42_A$ and $42_B$ may be provided by proportional flow devices which respond to the pressure changes sensed at the control inputs to vary gas flows at high slew rates consistent with a switching or flip flop flow diverting effect between the two controllers.

It will be appreciated that whereas it is convenient to stop the flow from controller device $47_A$ by the same pressure feedback signal which triggers device $47_B$ into conduction, and vice versa, the fluid flow may be stopped only after the other device begins to increase flow by coupling the control inputs $46_A$ and $46_A$ to the output ports of the other device or $44_A$, $44_B$ of the controllers.

Thus, in the form shown in FIG. 1 the flow controllers $42_A$ and $42_B$ associated with opposing damping chambers, by both responding to the same chamber pressure signals operate in unison to divert the flow from one damping chamber to the other alternately.

An alternative form of damping arrangement, generally similar to that shown in FIG. 1, has gas flow control means comprising the same form of collar displacement feedback means but the pair of gas flow controllers associated with the opposite pair of damping chambers taking a different form as shown at 60 in FIG. 2. The chambers 34 and 35 have associated therewith gas flow controllers in the form of a common self-powered gas flow diverter comprising a fluid logic flip flop 61 having an input port 62 connected to gas source 40 and two output ports 63 and 64 connected to the damping chamber ducts 38 and 39 respectively. The flip flop also has two trigger ports 65 and 66 which provide control inputs arranged to receive signals from the shaft displacement feedback means 50 related to pressures and coupled to the sensing chamber 51 or 53 by ducts 52 and 54 respectively. In operation the periodic chamber pressures sensed and transmitted by the ducts 52 and 54 alternately direct the flow of gas through the diverter such that it is diverted between, or alternately fed to, the damping chambers 34 and 35 in the same manner as described above. In operation of such a fluidic device, switching between states may require that one control input port is vented. If appearance of high pressure at one control input is not accompanied by sufficiently low pressure at the other to effect venting, then separate vents, indicated by ghosted lines 65' and 66' may be employed.

It will be appreciated that the axially directed thrusts which result from the periodic forced increases in damping chamber pressure are less than the vibration-producing forces in order to constitute damping forces and not sources of vibration in their own rights, and to this end the pressure and/or rate of gas supplied by the source 40 may be separately controlled (not shown) in accordance with a separate measure of the amplitude of shaft vibration. However, it will be appreciated that when such shaft vibrations occur at a frequency rate that may be consistent with high rotation rate of a turbomachine shaft of large rotating mass it is necessary to combine a fast response to chamber pressure changes in accordance with the thrust collar vibration rate with supply of gas at sufficient rate and/or pressure to produce a significant axial retarding force against the shaft to effect damping.

As the gain of any such self-powered fluidic devices currently available is, in practice, limited each controller may require to have means for boosting the output of a single stage fluidic device and/or comprise a multi-stage or tandem connection or such fluidic devices as master and slave devices.

If the modulated gas flow available from either of the above described forms of gas flow controllers is insufficient each such gas flow controller may have in line with its associated damping chamber a flow inductor as shown ghosted at $67_A$ and $67_B$ in FIG. 1(b) or as 68 and 69 in FIG. 2.

Referring to FIG. 1, in line with the duct means 38 associated with chamber 36 and controller device $47_A$ a flow inductor $67_A$, known per se, has an inductor output port $67_{A1}$ coupled to the chamber duct means 38 by way of controller output port $44_A$, an inductor main input port $67_{A2}$ coupled to a gas supply 40', conveniently, but not necessarily, the gas supply 40, and an inductor control input port $67_{A3}$ to receive the modulated gas flow from the device $47_A$. The flow inductor in known manner combines the gas flows at the inductor input ports and provides at the inductor output port a boosted gas flow modulated in accordance with the modulation at the inductor control input port.

It will be seen from FIG. 2 that corresponding flow inductors 68 and 69 may be associated with each output port 63 and 64 respectively of the flow diverter flip flop 61.

Alternatively, or additionally, to the use of such flow inductor or the like to boost the modulated supply of gas to the damping chamber means, each active gas flow controller $42_A$, $42_B$, 60 etc. may comprise a multistage arrangement, that is comprise a plurality of flow control devices connected in tandem or cascade, the plurality comprising a master device and one, or possibly more than one, slave device to boost the modulation supply of gas to the damping chamber.

Referring to FIG. 3(a) this shows in semi-schematic form a third embodiment 70 of the controller pair associated with damping chambers 34 and 35 and corresponding to controller pair $42_A$ and $42_B$. Again, many of the parts correspond to those shown and described in relation to FIG. 1 and are given like reference numbers. The gas flow controllers are identified as $42'_A$ and $42'_B$. The gas flow controller $42'_A$ comprises the aforementioned fluidic device $47_A$ which provides a master device and at least one slave device $71_A$ of similar form, each device having input, output and control ports. The master device has its input and control ports connected to the controller ports $43_A$, $44_A$ and 45 as described above. The slave device 71 has its input port connected to the controller input port $43_A$ (or possibly directly to a different supply shown ghosted as 40") and its output port connected to the controller output port $44_A$. The output port $47'_A$ of the master device is connected to a control input port $72_A$ of the above device $71_A$. The controller $42'_B$ has both master and slave devices identified by reference subscripts 'B'; the output port $47'_B$ of master device $47_B$ is coupled to the control input $72_B$ of slave device $71_B$ and to control input $73_A$ of slave device $71_A$. Likewise, the output port $47''_A$ of master device $47_A$ is also connected to control input $73_B$ of slave device $71_B$. It will be appreciated that operation is substantially as described for controllers $42_A$ and $42_B$ except that overall gain of the each active controller is increased.

It will also be appreciated that as the separate controllers may be contained within a single flow diverting device, such as the fluid flip flop 61 shown in FIG. 2, a multistage controller may include master and slave devices the slave devices likewise be combined as shown on the fourth form 80 illustrated in FIG. 3(b). The controller includes a master flip flop 61 and a slave flip flop 81 having an input port 82 connected to the supply 40 (or alternative 40"), dual output ports 83 and 84 which are connected to the controller output ports 63 and 64 and supply fluid to the damping chambers 34 and 35 alternately as switched by the supply of fluid on alternate output ports of control flip flop 61 that are connected to the control inputs 85, 86 of the slave device.

It will be appreciated that if a greater phase advance than can be obtained from the pressure sensing chambers disposed as shown, the connections between the sensing chambers and control inputs may be interchanged to provide a further 180 degrees phase advance and combined with delay means (not shown) to provide a desired lesser phase advance.

Also, if desired, the gas pressure sensing chambers may be incorporated into the damping chambers, the gas flow control means then incorporating regulation to ensure that the supply is lessened in order to permit the pressure therein to subsequently fall and thus the, or another pressure sensing chamber, to function in the next cycle of axial oscillation.

The above described embodiments all employ thrust collar displacement feedback means 50 which senses the pressure within sensing chambers as modulated by the approach or departure of the thrust faces of the collar to control the active gas flow controllers. FIG. 4 shows part of a sectional elevation similar to FIGS. 1 but with gas flow control means comprising a second embodiment of thrust collar displacement feedback means indicated generally at 50' associated with a pair of gas controllers typified by controller 61 described in relation to FIG. 2. The shaft displacement feedback means 50' comprises for each damping chamber 34 and 35 associated with the flow diverter 61, a control duct $91_A$, $91_B$ extending between the control input port 65, 66 respectively and supply 40 (or alternative supply 40''') preferably by way of a flow controlling, and possibly isolating, orifice $92_A$, $92_B$. A leakage nozzle $93_A$ is disposed in the housing adjacent the damping chamber 34 and opening towards said thrust face $19_B$ of the collar 20 such that the nozzle has a flow rate dependant upon the separation of the thrust force from the nozzle.

A leakage duct $94_A$ extends between the nozzle $93_A$ and the control duct $92_A$ such that the pressure of gas in the control duct and supplied to the control input 65 of the controller flip flop is a function of shaft displacement with respect to the nozzle by said varied leakage rate through the nozzle. A corresponding leakage nozzle $93_B$ and leakage duct $94_B$ controls leakage from control duct $92_B$ and control input 66 in antiphase with the nozzle $93_A$, in other respects operation being as described above.

It will be appreciated that a gas damping arrangement in accordance with this invention, and incorporating damping chambers arranged to substantially surround the shaft, may act as a gas seal by virtue of the continuous leakage therefrom of gas supplied by supply 40 and operate thereas independently of any other form of gas seal, such as that 22 aforementioned.

Although in its simplest form the axial damping arrangement comprises for each thrust face a continuous annular damping chamber, the damping chamber means may comprise a series of discrete chambers extending a limited extent circumferentially individually and possibly in total.

Likewise the gas pressure sensing chambers 51 and 53 may comprise a single circumferentially limited chamber or a plurality of such chambers arrayed about the shaft axis.

As is well known in the art the fluidic devices suitable for controllers $47_A$ and $47_B$, slave controllers $71_A$ and $71_B$, and flip flops 61 and 81, as well as flow inductors $67_A$, $67_B$ or 68 and 69 if appropriate, may be implemented with no moving parts and it will be appreciated from the above described embodiments, therefore, that it is possible to provide an active damping arrangement for controlling axial shaft vibrations by alternately directing gas flow using such fluid flow elements that involve no moving parts nor external control facilities, and to this end the gas flow control means be constructed with the damping chambers and ducts within a housing therefor. Furthermore, the flow boosting inductors or slave devices may be arranged to be supplied with gas (supplies 40' or 40'') at a lower pressure than source 40 provides to the controller but at greater flow rates, possibly employing gas from the atmosphere within a closed housing when this is above ambient pressure.

Variations may be made to the forms of operation described for the various gas flow controllers. As described above the each pair of independent controllers, such as $42_A$ and $42_B$, are operated together in a bistable, flow diverting mode corresponding to flip flop 61, gas flow from each controlled output being inhibited by a signal causing a flow from an alternate controller. It will be appreciated that both such devices may alternatively be operated in a monostable mode by having one of the control inputs fed at a controlled pressure from the supply 40 (or an alternative) to default the controller device to a particular flow state unless it is overridden by a pressure feedback signal from the shaft collar displacement feedback means. Alternatively such devices may be operated in an astable mode, switching automatically at a predefined frequency related to the normal shaft axial vibration rate and synchronised as to phase, appropriately advanced, by suitable shaft displacement feedback means.

The fluid logic flip flop 61, for example may have its control input ports connected to each other to define an oscillator whose frequency is defined by the length and/or volume of the interconnecting line, such influencing parameters being controlled (possibly be magnetorestrictive components) by some transducer which determines shaft vibration motion.

Shaft position feedback means may, instead of detecting changes in pressure as the shaft mounted collar moves to and from a sensing chamber or nozzle, determine the position of the shaft or collar with respect to the housing by other sensing means and/or with respect to any other part of the housing, possibly associated with the actively controlled bearing arrangement and provide signals in forms suitable for direct or indirect control of the active controller devices.

Whereas the use of self-powered devices is convenient if such devices can be incorporated into the housing the control of gas flow may be achieved by active gas flow controllers other than self-powered fluidic devices, such as conventional valves requiring an external power source, and in such circumstances the feedback control signals may be provided other than by the chamber pressure and gas leakage monitored as described and/or adapted for the above mentioned bistable, monostable as synchronised astable operation.

When employing gas flow controllers which may be integrated readily into the housing, the invention is not limited to gas flow control means employing active controllers of the type described above which have a gain factor and are controlled by axial position feedback means which provide control signals to control inputs. The gas flow control means may comprise a direct acting form of gas control means as shown in FIG. 5.

Referring to FIG. 5, a schematic view of a further arrangement 100 is shown. The housing, shaft, shaft mounted collar with opposing thrust faces, damping chambers, supply and supply ducts substantially as shown in FIG. 1 and like references used. The gas flow damping means, designated generally at 101 comprises direct acting as flow controller for each damping chamber. For chamber 34, controller 102 comprises a control duct 103 extending between duct means 38 of damping chamber 34 and the gas supply 40, possibly by way of flow controlling/isolating orifice 104, and supplies gas directly and continuously to the damping chamber. A leakage nozzle 105 is disposed in the housing 12 adjacent the damping chamber 34 and opens towards the thrust face $19_A$ of facing the shaft collar. A leakage duct 106 extends between the nozzle 105 and the control duct 103 such that the pressure in the control duct, and thus the supply of gas to the damping chamber, is varied by leakage from the nozzle as a function of thrust displacement, that is, of shaft displacement, with respect to the nozzle. Thus as the thrust face approaches the nozzle and the damping chamber, gas leakage from the latter is impeded and pressure increases within the damping chamber to provide the damping effect described hereinbefore.

A corresponding controller 110 is associated with damping chamber 35.

As mentioned hereinbefore, the damping arrangement may act also as a gas seal by virtue of its own structure of chambers surrounding the shaft and a constant leakage of gas therefore via the restrictions formed by chamber walls defining only a small clearance from the shaft and the collar mounted thereon.

The axial damping arrangement may be provided separately from any gas sealing function although the gas leaking from the damping chambers along the clearance between shaft and housing may perform a cooling function to other components, such as bearings mounted between the shaft and housing.

Because the damping arrangement, insofar as it interfaces between the rotating surface of a radially extending thrust face and the housing, comprises bounded damping chambers to which gas is supplied to maintain a super ambient pressure, such chambers may be combined with elements of an axial thrust bearing other than the back-up bearing arrangement provided by the thrust faces $18_A$, $19_A$ or $18_B$, $19_B$. For instance the damping arrangement may be integrated into an axial magnetic thrust bearing or gas bearing or a combination thereof as illustrated in sectional elevation in FIG. 6.

An axial magnetic bearing 120 includes an armature defined by collar 20 that is rotatable with the shaft and at least one annular electromagnetic stator 122. The stator has electromagnetic coil means 123 and a pair of radially spaced poles 124, 125 directed towards a radially extended thrust face, $19_A$ of the armature. In operation magnetic flux extends by way of the poles and armature to exert an axial force on the rotating armature. An annular damping chamber 130 is disposed radially alongside the pole pieces, conveniently between them, and is coupled by duct 131 to gas flow control means as described hereinbefore.

The chamber 130 may also comprise a pressure chamber of an axial gas bearing which is maintained at elevated pressure to apply axial thrust on the rotor/armature 20, the pressure chamber of the gas bearing thus being common with the damping chamber of the damping arrangement.

Such an axial gas bearing arrangement may of course be implemented without the magnetic bearing, and either or both types may include the back-up bearing arrangement $18_A$, $19_A$ shown and described with reference to FIG. 1.

All of the embodiments described above have been in relation to a shaft having a radially extending collar displaying two oppositely directed thrust faces ($19_A$ and $19_B$) disposed in close proximity in the housing and each having associated therewith a damping chamber and gas flow control means therefor. It will be appreciated that in line with commonly employed practice wherein such opposite thrust faces are separated towards opposite ends of the shaft for thrust forces to be applied, the damping chambers and thrust face position feedback means may likewise be separated in accordance with the disposition of such thrust faces, the gas flow controllers then being connected to both locations or separate in dependence upon the form taken.

If desired, and particularly if there is only a single thrust face, a single damping chamber may be provided to apply an axial damping force to one part of the axial reciprocation that comprises the vibration. .

It will also be appreciated that whereas it is convenient for each pressure sensing chamber or nozzle to open towards, and be affected by, the thrust face associated with a damping chamber, the feedback may be associated with any radially extending surface that moves axially with the shaft, whether at the same speed or otherwise, and possibly located remotely from the thrust face or faces on which any damping chamber acts.

It will be appreciated that where a single thrust face is employed at any one shaft location an axial thrust damping arrangement per se may have a thrust face provided, for example by a simple shoulder intermediate two shaft portions of different diameters.

Other variations are possible to vary the centre frequency of the band in which a useful phase advance is achieved; for instance, the dimensions of any damping chamber may be altered by providing that at least one wall is adjustable in position by means of adjusting screw or push rod or the chamber volume altered by means of a tuning screw or stub corresponding to the adjusting screw or push rod.

It is to be understood that a damping arrangement in accordance with the present invention may be employed for such damping purpose alone and separately from combination with any other device, such as a gas seal or bearing, and to perform its function will then be of such a structure that it provides or has specifically provided for use therewith a housing, containing the damping and any other chambers, through which the shaft extends.

Other variations may be made to the above described embodiments without departing from the scope of the invention.

We claim:

1. An axial thrust vibration damping arrangement for a rotor shaft rotatable within a housing, said damping arrangement comprising at least one radially extending thrust face fixed with respect to the rotor shaft and facing along a longitudinal axis of the shaft; at least one damping chamber in the housing, open towards the thrust face and extending at least part way about the shaft; at least one source of gas at elevated pressure; a gas duct connected to said source and opening into said at least one damping chamber; and a gas flow controller responsive to reciprocation of the thrust face to modulate supply of gas to said at least one damping chamber by way of said gas duct, and thus the pressure therein, at the same frequency as the thrust face reciprocation and advanced in phase with respect to variations in thrust face position relative to said at least one damping chamber within a predetermined frequency range to effect a corresponding variation in axial thrust on the thrust face and damping of said thrust face reciprocation.

2. An arrangement as claimed in claim 1 wherein said gas flow controller includes a thrust face displacement feedback loop, and wherein said gas flow controller has an input port connected to a said at least one gas source, an output port connected to the gas duct and at least one control input connected to receive signals from the thrust face displacement feedback loop to effect control of gas flow between said gas source and said gas duct.

3. An arrangement as claimed in claim 2 in which the gas flow controller comprises a self powered device responsive to gas pressure at said control input and the thrust face displacement feedback loop is arranged to provide a gas pressure to said control input as a function of thrust face displacement with respect to said at least one damping chamber.

4. An arrangement as claimed in claim 3 in which the thrust face displacement feedback loop comprises a feedback duct extending between said control input and a pressure sensing chamber opening towards a radially extending surface coupled for axial motion with the shaft.

5. An arrangement as claimed in claim 4 in which said pressure sensing chamber is disposed adjacent said at least one damping chamber and opens towards the thrust face associated with said at least one damping chamber.

6. An arrangement as claimed in claim 3 in which the thrust face displacement feedback loop comprises a feedback duct extending between the associated controller control input and said at least one damping chamber operable to provide a gas pressure to the controller as a function of gas pressure, and thus thrust face position with respect to, said at least one damping chamber.

7. An arrangement as claimed in claim 3 in which the thrust face displacement feedback loop includes a control duct extending between the control input and said at least one source of gas and a leakage nozzle disposed in said housing and opening towards a radially extending surface coupled for axial motion with the shaft, the nozzle having a leakage rate dependent upon separation of the thrust face from the nozzle, and a leakage duct extending between said orifice and control duct operable to vary the pressure of the gas from said source to said controller control input as a function of thrust face displacement with respect to the nozzle.

8. An arrangement as claimed in claim 7 in which the leakage nozzle is disposed to open towards said thrust face associated with said at least one damping chamber.

9. An arrangement as claimed in claim 1 in which said at least one damping chamber includes a second damping chamber axially opposed to said at least one damping chamber; a second gas duct opening to said second damping chamber; and a second gas flow controller, each gas flow controller comprising a common gas flow diverter operable to control the flow of gas to each of said damping chambers alternately.

10. An arrangement as claimed in claim 9 in which each gas flow diverter includes at least one fluid logic flip flop having a pair of output ports connected one each of said damping chambers by way of said gas ducts.

11. An arrangement as claimed in claim 2 in which the active flow controller comprises a plurality of flow control devices connected in tandem, there being a master device and at least one slave device, each device having input, output and control ports, said master device having the input port thereof connected to said gas source and comprising the input port of the flow controller, each control port connected to said thrust face displacement feedback loop and output port connected to the control port of the first slave device, the output port of each slave device being connected to the control input port of the next slave device and the output port of the last slave device providing the output of the flow controller.

12. An arrangement as claimed in claim 9 in which each gas flow controller has in line with its associated damping chamber a flow inductor comprising an inductor output port coupled to a respective one of said ducts, an inductor main input port coupled to a said gas source and an inductor control input port coupled to receive said modulated gas, said flow inductor being operable to combine the gas flows at said inductor input ports to provide at the inductor output port a boosted gas flow modulated in accordance with the modulation at the inductor control input port.

13. An arrangement as claimed in claim 1 in which the gas flow controller comprises a direct acting flow controller including a controller duct extending between said at least one damping chamber and said gas source, and a leakage nozzle disposed in said housing and opening towards a radially extending surface coupled for axial motion with the shaft, the nozzle having a leakage rate dependent upon separation of the thrust face from the nozzle, and a leakage duct extending between said nozzle and controller duct operable to vary the gas pressure in said controller duct, and thus the supply of gas to said at least one damping chamber, as a function of thrust face displacement with respect to the nozzle.

14. An arrangement as claimed in claim 13 in which the leakage nozzle is disposed to open towards said thrust face associated with said at least one damping chamber.

15. An arrangement as claimed in claim 1 in which said at least one damping chamber comprises an annular chamber extending completely about the shaft.

16. An arrangement as claimed in claim 1 in which said gas source modulation is advanced in phase between 135 degrees and 0 degrees with respect to said shaft vibration.

17. An arrangement as claimed in claim 14 in which said phase advance is substantially 90 degrees.

18. An arrangement as claimed in claim 1 in which the gas flow controller and said duct are contained within the housing.

19. A combination of a rotor shaft supported for rotation and a housing through which the rotor shaft extends, surrounded by a clearance from said housing, said housing including a gas path defined between the housing and shaft comprising at least one annular chamber surrounding, and open towards, the shaft, at least one supply of gas arranged to be passed along the shaft and an axial vibration damping arrangement; said vibration damping arrangement comprising damping chamber means defined in the housing comprising at least one damping chamber open towards the thrust face and extending at least part way about the shaft, at least one supply of gas at elevated pressure, gas duct means opening into each said chamber and gas flow control means operable to provide a positive pressure within the damping chamber means acting axially on the thrust face and comprising, for each damping chamber, a flow controller responsive to reciprocation of the thrust face to and from the housing to modulate the supply of gas to the damping chamber by way of the duct means, and thus the pressure therein, at the same frequency as the thrust face reciprocation and advanced in phase with respect to variations in thrust face position relative to the chamber within a predetermined frequency range to effect a corresponding variation in axial thrust on the thrust face and damping of said shaft axial reciprocation.

20. An axial thrust bearing arrangement for a rotor shaft extending through a housing and spaced therefrom by a clearance, said arrangement including an axial vibration damping arrangement comprising at least one radially extending thrust face fixed with respect to the rotor shaft and facing along the axis of the shaft, damping chamber means defined in the housing comprising at least one damping chamber open towards the thrust face and extending at least part way about the shaft, at least one supply of gas at elevated pressure, gas duct means opening into each said chamber and gas flow control means operable to provide a positive pressure within the damping chamber means acting axially on the thrust face and comprising, for each damping chamber, a flow controller responsive to reciprocation of the thrust face axially to and from the housing to modulate the supply of gas to the damping chamber by way of the duct means, and thus the pressure therein, at the same frequency as the thrust face reciprocation and advanced in phase with respect to variations in thrust face position relative to the chamber within a predetermined frequency range to effect a corresponding variation in axial thrust on the thrust face and damping of said shaft axial reciprocation.

21. A bearing arrangement as claimed in claim 20 in which the axial vibration damping arrangement is disposed with respect to the bearing such that gas leakage from each said damping chamber comprises cooling gas for the bearing flowing axially of the shaft.

22. A bearing arrangement as claimed in claim 20 comprising a gas bearing including at least one pressure chamber extending about the shaft and opening towards a radially extending thrust face against which elevated chamber pressure exerts a bearing thrust and at least one said pressure chamber being common with a damping chamber of the damping arrangement.

23. An axial magnetic thrust bearing for a rotor shaft extending through a housing and spaced therefrom by a clearance, including an armature rotatable with the shaft and at least one annular electromagnetic stator having an electromagnetic coil and a pair of radially spaced poles directed towards a radially extending thrust face of the armature on which a bearing force is applied, said thrust bearing including an axial vibration damping arrangement including at least one damping chamber disposed radially alongside at least one of the stator poles and opening towards said armature thrust face to exert damping forces thereon; at least one source of gas at elevated pressure, gas duct means opening into said at least one chamber and gas flow control means operable to provide a positive pressure within said at least one damping chamber acting axially on the armature thrust face and comprising a flow controller responsive to reciprocation of the armature thrust face axially to and from the housing to modulate the supply of gas to said at least one damping chamber by way of the duct means, and thus the pressure therein, at the same frequency as the armature thrust face reciprocation and advanced in phase with respect to variations in armature thrust face position relative to said at least one damping chamber within a predetermined frequency range to effect a corresponding variation in axial thrust on the armature thrust face and damping of said shaft axial reciprocation.

24. An axial magnetic thrust bearing for a rotor shaft extending through a housing and spaced therefrom by a clearance, including an armature rotatable with the shaft and at least one annular electromagnetic stator having an electromagnetic coil and a pair of radially spaced poles directed towards a radially extending thrust face of the armature on which a bearing force is applied, said thrust bearing including an axial vibration damping arrangement including at least one damping chamber; and a gas bearing comprising at least one pressure chamber disposed between the stator poles, extending about the shaft and opening towards said armature against which elevated chamber pressure exerts a bearing thrust, at least one said pressure chamber being common with said at least one damping chamber of the damping arrangement; at least one source of gas at elevated pressure, gas duct means opening into said at least one damping chamber and gas flow control means operable to provide a positive pressure within said at least one damping chamber acting axially on the armature thrust face and comprising a flow controller responsive to reciprocation of the armature thrust face axially to and from the housing to modulate the supply of gas to said at least one damping chamber by way of the duct means, and thus the pressure therein, at the same frequency as the armature thrust face reciprocation and advanced in phase with respect to variations in thrust face position relative to said at least one damping chamber within a predetermined frequency range to effect a corresponding variation in axial thrust on the armature thrust face and damping of said shaft axial reciprocation.

* * * * *